(12) United States Patent
Kaneko et al.

(10) Patent No.: US 7,035,084 B2
(45) Date of Patent: Apr. 25, 2006

(54) SECONDARY BATTERY AND CAPACITOR USING INDOLE POLYMERIC COMPOUND

(75) Inventors: Shinako Kaneko, Tokyo (JP); Toshihiko Nishiyama, Tokyo (JP); Masaki Fujiwara, Tokyo (JP); Gaku Harada, Tokyo (JP); Masato Kurosaki, Tokyo (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 10/044,985

(22) Filed: Jan. 15, 2002

(65) Prior Publication Data

US 2002/0132164 A1    Sep. 19, 2002

Related U.S. Application Data

(62) Division of application No. 09/619,708, filed on Jul. 19, 2000, now Pat. No. 6,509,116.

(30) Foreign Application Priority Data

Jul. 22, 1999    (JP) .............................. 1999/207499

(51) Int. Cl.
  *H01G 9/04* (2006.01)
  *H01G 9/145* (2006.01)
(52) U.S. Cl. ...................... 361/508; 361/528; 252/62.2
(58) Field of Classification Search ........ 361/503–507, 361/508–511, 523, 525–528; 252/62.2
See application file for complete search history.

(56) References Cited

U.S. PATENT DOCUMENTS

| | | | |
|---|---|---|---|
| 4,502,934 A | 3/1985 | Gazard et al. | |
| 4,543,306 A | 9/1985 | Dubois et al. | |
| 4,864,472 A * | 9/1989 | Yoshimura et al. | 361/525 |
| 5,626,729 A | 5/1997 | Lian et al. | |

FOREIGN PATENT DOCUMENTS

| | | |
|---|---|---|
| EP | 1 091 434 A | 4/2001 |
| EP | 1 107 343 A | 6/2001 |
| JP | 5-148320 | 6/1993 |
| JP | 9-204932 | 8/1997 |
| WO | WO 95/07555 | 3/1995 |
| WO | WO 95/24741 A | 9/1995 |

OTHER PUBLICATIONS

P.C. Pandey, et al., "Electrochemical Synthesis of Polyindole and Its Evaluation for Rechargeable Battery Applications," J. Electrochem. Soc., vol. 145, No. 3, Mar. 1998, pp. 999-1003, with abstract.
H. Talbi, D. Billaud, "Oxidative electropolymerization of 5-nitroindole", Synthetic Metals, vol. 97 No. 3, Sep. 30, 1998, pp. 239-244. XP001157504.
G. Kokkinidis, A. Kelaidopoulou, "Electromechincal behavior of nitroindoles: oxidative electropolymerization and reduction of the nitro group of polymerized and non-polymerized 4-nitro and 5-nitroindole" Journal Do Electroanalytical Chemistry, vol. 414, No. 2, Oct. 20, 1996, pp. 197-208. XP001157503.
Database WPI, Section Ch, Week 198847, Derwent Publications Ltd. London, GB An 1988-335756, XP002255687.

* cited by examiner

*Primary Examiner*—Eric W. Thomas
(74) *Attorney, Agent, or Firm*—Sughrue Mion, PLLC (57) ABSTRACT

Secondary batteries and capacitors have a high electromotive force together with a high cyclic property and are capable of fast charging and discharging, using a polymeric compound having a high stability and high reactivity in an acidic ambient, as an electrode active material. The secondary batteries and capacitors include an indole polymeric compound as an electrode active material. The polymeric compound uses a proton as a charge carrier and has a constituent represented by general formula (1):

(1)

wherein each R denotes a hydrogen atom, a halogen atom, a hydroxyl group, a carboxyl group, a sulfonic group, a sulfuric acid group, a nitro group, a cyano group, an alkyl group, an aryl group, an alkoxyl group, an amino group, an alkylthio group and an arylthio group, which may be the same or different from each other, and at least one R is a substituent other than a hydrogen atom.

14 Claims, 4 Drawing Sheets

SECONDARY BATTERY AND CAPACITOR USING INDOLE POLYMERIC COMPOUND

This is a divisional of application Ser. No. 09/619,708 filed Jul. 19, 2000 now U.S. Pat. No. 6,509,116; the disclosure of which is incorporated herein by reference.

BACKGROUND OF THE INVENTION

1. Field of the Invention

The present invention relates to a secondary battery and capacitor, and more particularly to a secondary battery and capacitor in which an indole polymeric compound is used as an electrode active material and a proton is employed as a charge carrier thereof.

2. Description of the Related Art

As an invention that employs indole, JP 5-148320A discloses a method of chemical-oxidative polymerization of indole monomers to obtain polyindole, and a conductive device that contains polymers polymerized through the method. The indole is limited only to the polyindole and the use of the conductive device is only for conductive films and electrochromic devices.

A paper on "*Electrochemical synthesis of polyindole and its evaluation for rechargeable battery applications*" describes a battery composed of Zn/ZnSO$_4$/Polyindole. This battery employs a neutral electrolytic solution. The reaction of the battery in the neutral electrolytic solution is accompanied with doping and de-doping of dopant anions. These dopant anions are large in size and low in mobility. Accordingly, this battery is disadvantageous to performances of fast charging and discharging.

SUMMARY OF THE INVENTION

An object of the present invention is to provide a secondary battery and capacitor having a high electromotive force together with a high cyclic property and being capable of fast charging and discharging, using a polymeric compound having a high stability and high reactivity in an acidic ambient, as an electrode active material.

In accordance with the present invention, a secondary battery and capacitor are provided, which include an indole polymeric compound as an electrode active material. The polymeric compound employs a proton as a charge carrier and has a constituent represented by general formula (1):

(1)

In the general formula, each R denotes a hydrogen atom, a halogen atom, a hydroxyl group, a carboxyl group, a sulfonic group, a sulfuric acid group, a nitro group, a cyano group, an alkyl group, an aryl group, an alkoxyl group, an amino group, an alkylthio group and an arylthio group. R's may be the same or different from each other. At least one R has a substituent other than a hydrogen atom. At least two R's are employed for bonding to form a polymer. These bonds may be double bonds.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE INVENTION

Embodiments of the invention will be described below in detail.

Figure 1:
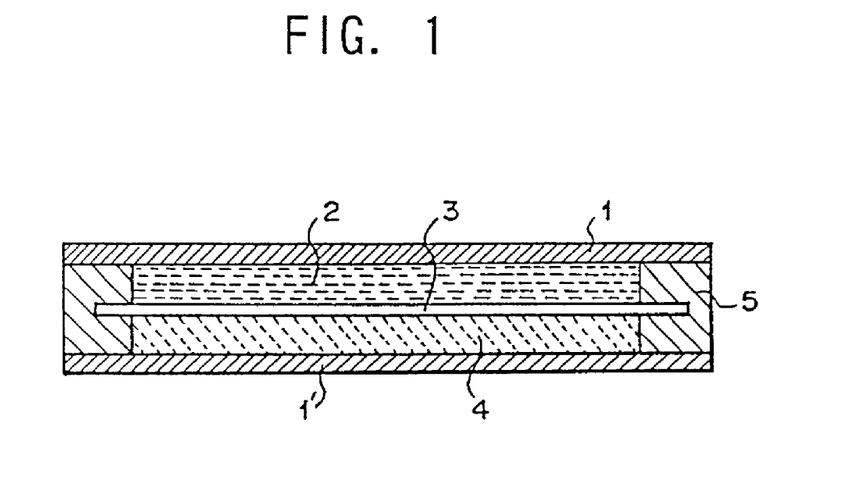
FIG. 1 is a cross sectional view of a secondary battery or capacitor of the present invention.

FIG. 1 shows a structure of a secondary battery or capacitor of the present invention. This secondary battery or capacitor comprises an anode material 2 formed on a collector 1 and a cathode material 4 formed on a collector 1', respectively. The anode material 2 is an indole polymeric compound. The cathode material 4 comprises an n-doped polymeric compound that can store charges through the reaction accompanied with absorption and desorption of protons, such as a quinoxaline polymeric compound or another polymeric compound reacting through absorption and desorption of protons. These polymeric compound electrodes and electrodes that are active in the presence of protons are formed on collectors 1, 1', respectively. The anode material 2 and the cathode material 4 are arranged opposing to each other, interposing therebetween a separator 3 that contains an electrolytic solution impregnated therein, or a gel electrolyte or solid electrolyte, in which the electrolytic solution contains protons. Any cathode material is available so long as it is active in the presence of protons.

The indole polymeric compound used for the anode material can be produced through an electrochemical or chemical method. The starting substance for synthesizing the indole polymeric compound of the anode material is an organic compound that can be used to form a polymeric compound having an indole skeleton through an electrical or chemical method such as electrolytic polymerization, chemical polymerization, condensation reaction and substitution reaction.

The indole polymeric compound of the anode material can be doped through an electrochemical or chemical method. Each X in the following reaction formulae (1) and (2) represents a dopant ion.

Reaction Formula (1)

Reaction Formula (2)

In the reaction formulae (1) and (2), each X exemplifies a halide ion, perchloric acid ion, tetrafluoroboric acid ion, sulfuric acid ion, alkylsulfonic acid ion, alkylsulfuric acid ion, trifluoromethanesulfonic acid ion and trifluoroacetic acid ion but any of the ions is available so long as it can be doped into the indole polymeric compound.

A conductive auxiliary may be added, if necessary, to ensure the conductivity of the indole polymeric compound electrode. The conductive auxiliary includes materials that can ensure the conductivity, for example, carbon black, crystalline carbon and amorphous carbon. An organic binder is also employed, if required, to secure these materials on the collector.

Although a mixing ratio of the above-mentioned constituents is arbitrary, in consideration of efficiency per unit weight or unit volume, preferably the indole polymeric compound is in a range of 30–95% by weight; the conductive auxiliary, 0–50% by weight; and the organic binder, 0–20% by weight. More preferably, the indole polymeric compound is in a range of 60–90% by weight. If the indole polymeric compound is less than 30% by weight, the reaction efficiency per unit volume easily lowers. If it exceeds 95% by weight, it becomes undesirably difficult to ensure the conductivity of the electrode.

The electrolytic solution is an aqueous or nonaqueous solution that contains protons preferably $10^{-3}$ mol/l to 18 mol/l, and more preferably $10^{-1}$ mol/l to 7 mol/l. If the content of protons is less than $10^{-3}$ mol/l, the low proton concentration reduces the reactivity of the electrode material. If the content of protons is more than 18 mol/l, the strong acidity reduces the activity of the material or solves the material. An alkaline metallic salt, an alkaline earth metallic salt, an organic sulfonate, a sulfate, a nitrate and a perchlorate can be added, if necessary, to the proton-containing electrolytic solution. In the aqueous or nonaqueous solution, such salts that can ensure the ionic conductivity are preferred. These salts are not limited both in type and in concentration.

Figure 2:
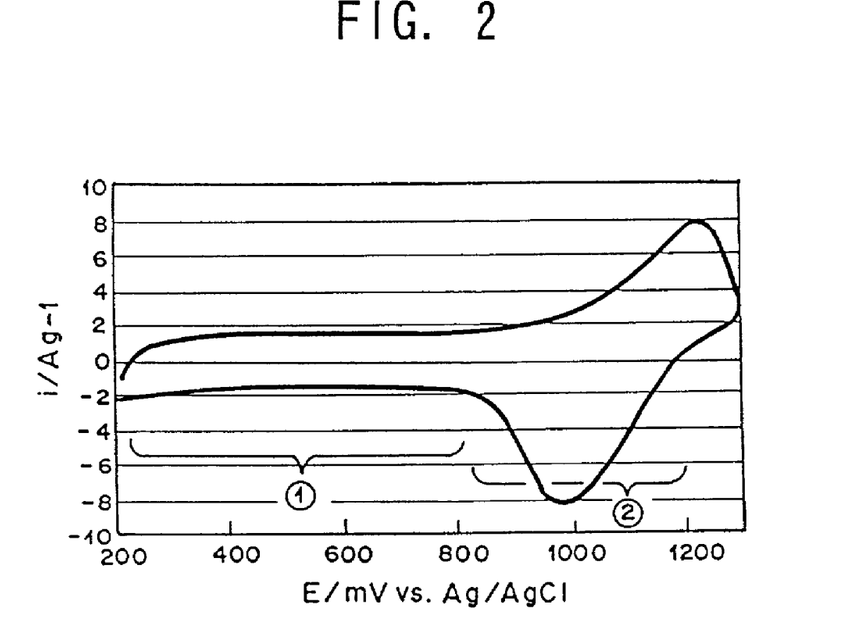
FIG. 2 is a cyclic voltamogram in an acidic aqueous solution of an indole polymeric compound.

The indole polymeric compound of the anode material has two reaction steps in the proton-containing electrolytic solution {the reaction formulae (1) and (2)}. FIG. 2 shows a typical cyclic voltamogram (hereinafter referred to as CV) in an acidic aqueous solution of the indole polymeric compound. The reaction of the reaction formula (1) accompanied with doping and de-doping dopants occurs within a region ① (in the vicinity of nearly 0–800 mV vs. Ag/AgCl). The reaction of the reaction formula (2) accompanied with absorption and desorption of protons occurs within a region ② (in the vicinity of nearly 800–1300 mV). It has been found that the reaction of the indole polymeric compound of the reaction formula (2) has a high reactivity and an excellent cyclic property.

The present invention provides a secondary battery and capacitor that has an excellent cyclic property and employs the reaction formula (2) in the proton-containing electrolytic solution (the reaction accompanied with absorption and desorption of protons) as the reaction of charge and discharge.

Charge and discharge tests were performed to evaluate the characteristics of the secondary battery and capacitor of the present invention. The charge and discharge were performed at charge and discharge current densities of 1,10 and 100 mA/cm² per unit electrode-opposing area of each battery. A capacity from a discharge starting voltage (electromotive force) to 80% voltage thereof is defined as a discharge capacity, which is represented using a capacity per active substance of the anode material. A charge and discharge cycle test was performed at a charge and discharge current density of 10 mA/cm², 60% discharge depth and 25° C. to compare characteristics of examples and comparative examples by their cycle number until the capacity reduces to 80% of the initial capacity.

The indole polymeric compound has a higher redox potential compared to a typical conductive polymeric compound of proton-conductive type such as polyaniline and a polymeric compound of quinone type such as polydiaminoanthraquinone. For example, in the acidic aqueous solution, polyaniline has a reaction accompanied with absorption and desorption of protons at 250 mV vs. Ag/AgCl, and polydiaminoanthraquinone has a reaction accompanied with absorption and desorption of protons at 650 mV vs. Ag/AgCl. In contrast, the indole polymeric compound has a reaction accompanied with absorption and desorption of protons at 800–1300 mV vs. Ag/AgCl in the acidic aqueous solution. Therefore, it can increase its electromotive force by 1000 mV at most relative to the battery or capacitor that employs the polymeric compound such as polyaniline and polydiaminoanthraquinone. Accordingly, a battery and capacitor with a high electromotive force can be obtained.

The indole polymeric compound has the reaction accompanied with doping and de-doping anions at the lower potential side (reaction formula (1)) along with the reaction by absorption and desorption of protons at the higher potential side (reaction formula (2)). The present invention employs the reaction of reaction formula (2) at the higher potential side, excellent in cyclic property, as the reaction of the secondary battery and capacitor to obtain an excellent cyclic property, while maintaining a high electromotive force.

In the reaction formula (2) of the indole polymeric compound, the reaction is accompanied only with the movement of a proton having a small ionic size. The present invention employs the reaction that is accompanied with the movement of a proton having the smallest ionic size and a larger mobility. Therefore, it is possible to obtain a secondary battery and capacitor capable of rapid charging and discharging.

Specific Examples of the present invention will be detailed below with non-limitative constitutions such as materials and battery arrangements herein exemplified.

EXAMPLE 1

A secondary battery was produced through the following procedures, using poly($^6$-nitroindole) represented by the following structural formula (2) as the anode material 2; polyphenylquinoxaline represented by the following structural formula (3) as the cathode material 4; and 40% sulfuric acid (5.3 mol/l) as the electrolytic solution.

Poly(6-nitroindole) was mixed with crystalline carbon as the conductive auxiliary at a weight ratio of 75:25, followed by addition of dimethylformamide to solve poly (6-nitroindole), and drying at 120° C. Then, the mixture was pulverized, followed by addition of the electrolytic solution of 40% sulfuric acid (5.3 mol/l) to produce an electrode paste. This paste was coated over a collector 1 with a 500 µm thick gasket 5 to obtain an electrode of the anode material 2.

As for production of an electrode of the cathode material 4, polyphenylquinoxaline was mixed with Ketjenblack as the conductive auxiliary at a weight ratio of 75:25, followed by addition of 40% sulfuric acid (5.3 mol/l) to produce an electrode paste. This paste was coated over a collector 1' with a gasket 5 similar to the anode.

Each electrode was pressed at a pressure of 1370 kPa (14 kgf/cm$^2$) to remove extra sulfuric acid. Thereafter, a separator 3, containing 40% sulfuric acid (5.3 mol/l) impregnated therein, was sandwiched between the anode material 2 and the cathode material 4 to produce a secondary battery as shown in FIG. 1.

Poly(6-nitroindole), used for the anode material of this example, was in a state that sulfuric acid ions were doped into it in the aqueous solution of 40% sulfuric acid, and the redox reaction accompanied with absorption and desorption of protons, corresponding to the reaction formula (2), proceeded at about 900–1200 mV vs. Ag/AgCl. As for polyphenylquinoxaline in the same solution, the redox reaction proceeded at about −100 to 100 mV vs. Ag/AgCl. Accordingly, for the secondary battery, constant current charge and discharge tests were performed at 1–100 mA/cm$^2$ with an electromotive force of 1.2 V.

Figure 3:
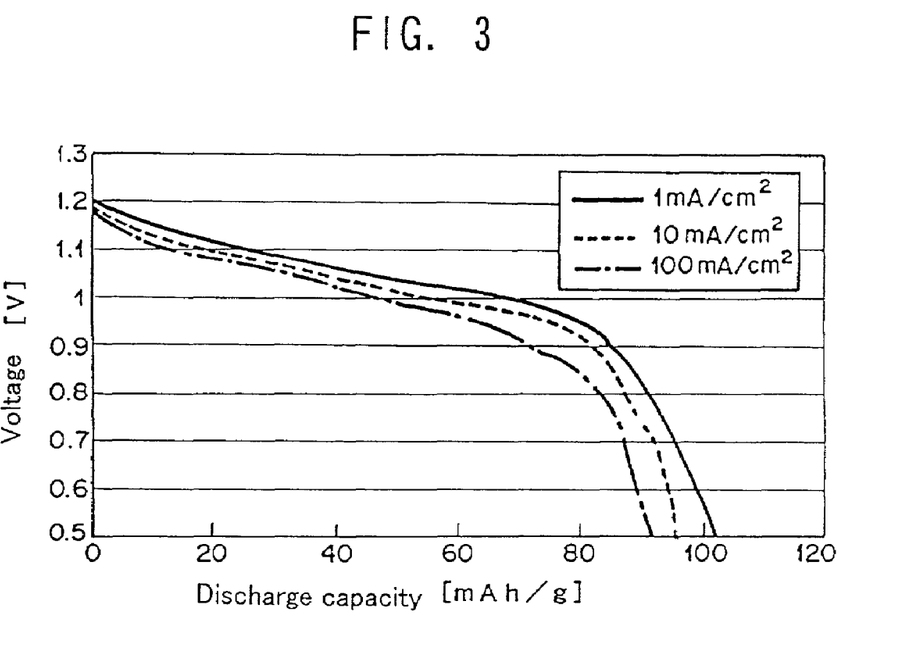
FIG. 3 shows discharge curves of a secondary battery according to Example 1.

The results from the secondary battery are shown in Table 1, and the discharge curve is shown in FIG. 3. The secondary battery of Example 1 achieved 79–65 mAh/g at charge and discharge current densities of 1–100 mA/cm$^2$. As the theoretical capacity of poly(6-nitroindole) is 84 mAh/g, its capacity occurrence rate was 94% at the charge and discharge current density of 1 mA/cm$^2$ with a very high reaction rate. In addition, a discharge capacity at a charge and discharge current density of 100 mA/cm$^2$ maintains 82% of capacity relative to that at 1 mA/cm$^2$. This indicates that this secondary battery is excellent in fast charge and discharge properties.

Table 1 shows a cyclic property, at a charge and discharge current density of 10 mA/cm$^2$, 25° C. and 60% discharge depth. The secondary battery had a cycle number of 24,000 from the initial capacity to 80% thereof, and exhibited a very excellent cyclic property.

The secondary battery had an electromotive force of 1.2 V, which improved by 0.8 V compared to a secondary battery of Comparative Example 1, and also had an excellent cyclic property. In fast charge and discharge at 100 mA/cm$^2$, the capacity reduction rate was 82%, which was very small, compared to that at 1 mA/cm$^2$. This indicates that this secondary battery is excellent in fast charge and discharge properties.

TABLE 1

|  | Electrolytic solution | Dopant | Ions involved in reactions of anode | Voltage (V) | Capacity (mAh/g) | | | Cyclic property (cycles) |
|  |  |  |  |  | Charge and discharge current density 1 mA/cm$^2$ | Charge and discharge current density 10 mA/cm$^2$ | Charge and discharge current density 100 mA/cm$^2$ |  |
|---|---|---|---|---|---|---|---|---|
| Example 1 | Aqueous solution | $SO_4^{2-}$ | $H^+$ | 1.2 | 79 | 76 | 65 | 24,000 |
| Example 2 | Aqueous solution | $SO_4^{2-}$ | $H^+$ | 1.3 | 85 | 84 | 77 | 15,000 |
| Example 3 | PC solution | $ClO_4^-$ | $H^+$ | 2.2 | 67 | 63 | 52 | 12,000 |
| Comparative Example 1 | Aqueous solution | $SO_4^{2-}$ | $H^+$ | 0.4 | 16 | 16 | 11 | 20,000 |
| Comparative Example 2 | Aqueous solution | $SO_4^{2-}$ | $HSO_4^-$ or $SO_4^{2-}$ | 0.9 | 29 | 22 | 13 | 125 |

The content of poly(6-nitroindole) in the anode material was changed to perform another charge and discharge test at 1 mA/cm$^2$. The results are shown in Table 2.

TABLE 2

| Poly(6-nitroindole) (wt. %) | Capacity (mAh/g) | Capacity (mAh/cc) |
|---|---|---|
| 30 | 81 | 8 |
| 45 | 81 | 14 |
| 60 | 79 | 21 |
| 75 | 79 | 53 |
| 90 | 63 | 52 |
| 95 | 51 | 45 |

The sulfuric acid concentration in the electrolytic solution was changed to perform a further charge and discharge test at 1 mA/cm$^2$. The results are shown in Table 3.

TABLE 3

| Sulfuric acid concentration (mol/l) | Capacity (mAh/g) |
|---|---|
| 0.001 | 51 |
| 0.01 | 57 |
| 0.1 | 88 |
| 1 | 81 |
| 3 | 79 |
| 5 | 78 |
| 7 | 65 |
| 18 | 36 |

EXAMPLE 2

A secondary battery was produced, using poly(5-cyanoindole) represented by the following structural formula 2' as the anode material; polyphenylquinoxaline as the cathode material; and an aqueous solution of 40% sulfuric acid as the electrolytic solution, through the same procedures as those of Example 1.

(2')

Poly(5-cyanoindole), used for the anode material was in a state that sulfuric acid ions were doped into it in the electrolytic solution, and the reaction accompanied with absorption and desorption of protons, corresponding to the reaction formula (2), proceeded about 1000–1300 mV vs. Ag/AgCl.

Accordingly, for the secondary battery, constant current charge and discharge tests were performed at 1–100 mA/cm2 with an electromotive force of 1.3 V.

Figure 4:
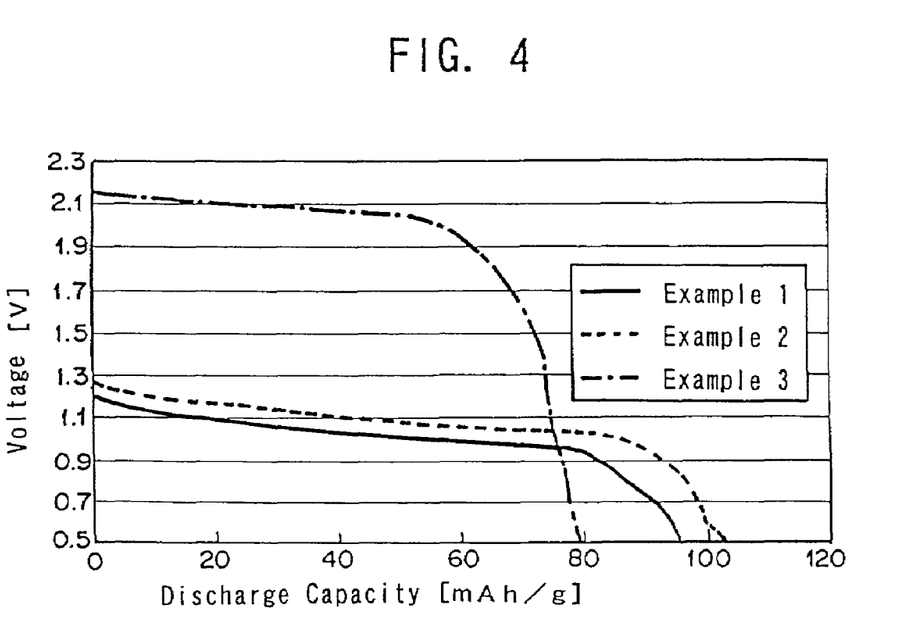
FIG. 4 shows discharge curves of secondary batteries at 10 mA/cm$^2$ according to Examples 1–3.

The results from the secondary battery are shown in Table 1 and the discharge curve is shown in FIG. 4. Discharge curves at 10 mA/cm$^2$ of Examples 1 and 3 are also shown in FIG. 4.

The discharge capacity achieved 85–77 mAh/g at charge and discharge current densities of 1–100 mA/cm$^2$. As the theoretical capacity of poly(5-cyanoindole) is 96 mAh/g, the capacity occurrence rate at a charge and discharge current density of 1 mA/cm$^2$ was 89%.

Table 1 shows a cyclic property, at a charge and discharge current density of 10 mA/cm$^2$, 25° C. and 60% discharge depth. The secondary battery had a cycle number of 15,000 from the initial capacity to 80% thereof.

The secondary battery increased by 0.1 V in electromotive force, compared to that of Example 1, and also its capacity at 1 mA/cm$^2$ improved by 7.6%. As for the discharge capacity at a reduction rate at 1 mA/cm was 91%, which was very small, and the secondary battery exhibited varied excellent charge and discharge properties.

EXAMPLE 3

A secondary battery was produced, using poly(6-nitroindole) as the anode material; polyphenylquinoxaline as the cathode material; and propylene carbonate (hereinafter referred to as PC) containing 1 mol/l of tetraethylammonium tetrafluoroborate and 0.1 ml/l of trifluoroacetic acid as the electrolytic solution. The PC solution was substituted for the aqueous solution of 40% sulfuric acid of Example 1 to produce the secondary battery through the same procedures as those of Example 1.

Poly(6-nitroindole), used for the anode material, was in a state that tetrafluoroboric acid ions were doped into it in the electrolytic solution, and the redox reaction accompanied with absorption and desorption of protons, corresponding to the reaction formula (2), proceeded at about 800 to 1200 mV vs. Ag/AgCl. As for polyphenylquinoxaline of the cathode material, the redox reaction proceeded at about −1100 to −900 mV vs. Ag/AgCl. Accordingly, for the secondary battery, constant current charge and discharge tests were performed at 1–100 mA/cm$^2$ with an electromotive force of 2.3 V.

The results from the secondary battery are shown in Table 1, and the discharge curves are shown in FIG. 4. Discharge curves at 10 mA/cm$^2$ of Examples 1 and 2 are also shown in FIG. 4.

The discharge capacity achieved 67–52 mAh/g at charge and discharge current densities of 1–100 mA/cm$^2$. As the theoretical capacity of poly(6-nitroindole) is 84 mAh/g, its capacity occurrence rate at a charge and discharge current density of 1 mA/cm was 79%.

Table 1 shows a cyclic property, at a charge and discharge current density of 10 mA/cm$^2$, 25° C. and 60% discharge depth. The secondary battery had a cycle number of 12,000 from the initial capacity to 80% thereof.

A nonaqueous solution is often used to greatly shift the redox potential of the electrode material. In this example, a nonaqueous solution was used to greatly shift the redox potential of the cathode material to the lower potential side, and then the electromotive force of the battery increased.

STRUCTURES OF COMPARATIVE EXAMPLES

A secondary battery was produced, using polyaniline as the anode material; polyphenylquinoxaline as the cathode material; and an aqueous solution of 40% sulfuric acid as the electrolytic solution, through the same procedures as those of Example 1.

Figure 5:
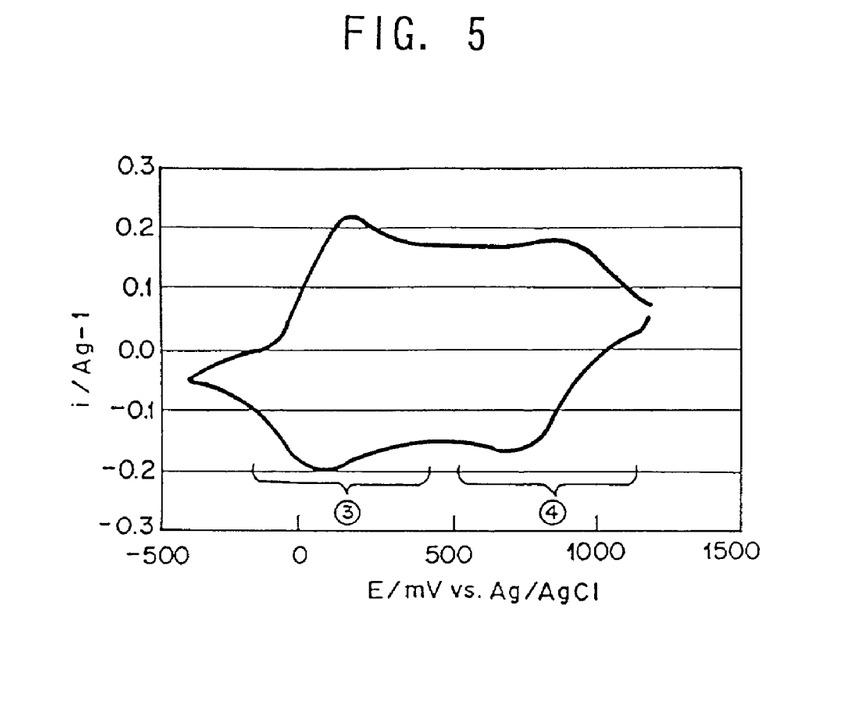
FIG. 5 is a cyclic voltamogram of polyaniline in an aqueous solution of 40% sulfuric acid.

FIG. 5 shows a CV of polyaniline in the aqueous solution of 40% sulfuric acid. As shown in FIG. 5, the reaction of polyaniline, accompanied with absorption and desorption of protons, corresponds to a reaction at the lower potential side (region ③) and the reaction at the higher potential side is a reaction accompanied with doping and de-doping of anions (region ④)). Therefore, in order to realize a secondary battery with a high cyclic property, the electromotive force of the battery extremely lowers. In order to elevate the electromotive force, it is required to employ the second redox reaction, which reduces the cyclic property.

In the second battery of this comparative example, there are contrary points: (i) the electromotive force of the battery lowers while the cyclic property is ensured; and (ii) the cyclic property lowers while the electromotive force of the battery is ensured. In this regard, characteristic comparison was performed on the assumption that Comparative Example 1 exemplifies a battery accompanied with the reaction at the lower potential side (region ③) and Comparative Example 2 exemplifies a battery accompanied with the reaction at the higher potential side (region ④).

COMPARATIVE EXAMPLE 1

Figure 6:
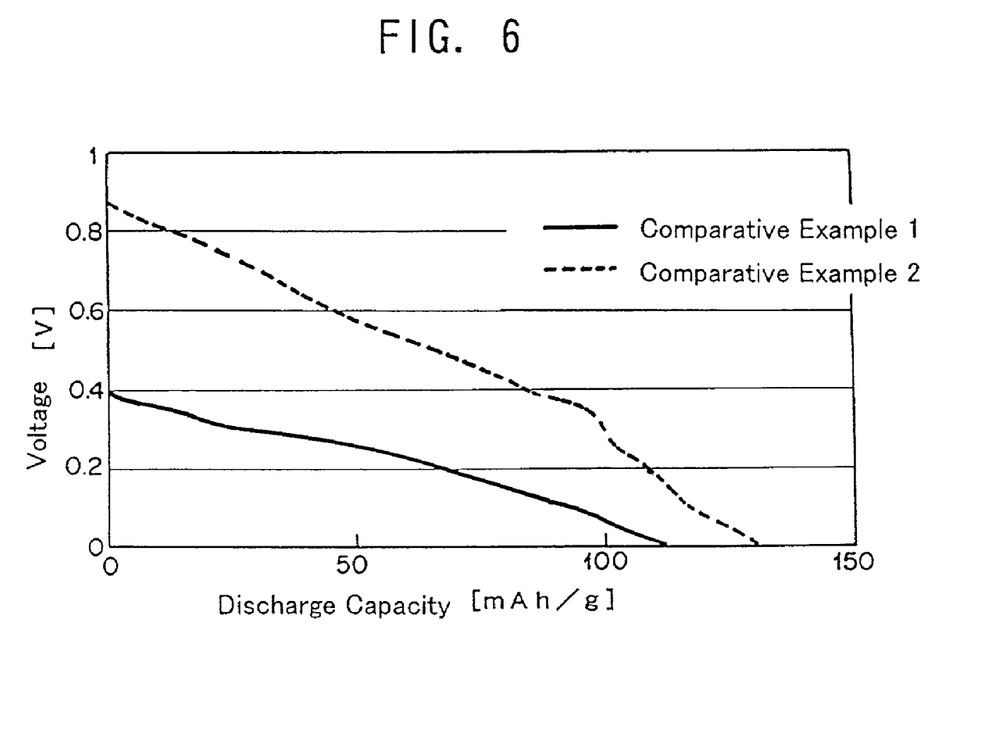
FIG. 6 shows discharge curves of secondary batteries at 10 mA/cm$^2$ according to Comparative Examples 1 and 2.

FIG. 6 shows a discharge curve at 10 mA/cm$^2$ of Comparative Example 1. The discharge curve has no flat potential part and exhibits a behavior almost similar to a discharge curve of a capacitor. It was because the anode material had a reaction potential extremely close to that of the cathode material potentials of both electrodes became the same before respective discharges finished. This inhibited causing a flat part in the discharge curve.

In Comparative Example 1, the capacity (discharge capacity down to 80% of the electromotive force) was 16 mAh/g at 1 mA/cm$^2$ with an electromotive force, 0.4 V, of the battery. Table 1 shows a cyclic property, at a charge and discharge current density of 10 mA/cm$^2$, 25° C. and 60% discharge depth. In Comparative Example 1, the cycle number until the capacity decreased to 80% of the initial capacity was 20,000.

COMPARATIVE EXAMPLE 2

FIG. 6 shows a discharge curve at 10 mA/cm$^2$ of Comparative Example 2. In this comparative example, a potentially dropped part occurred. It was because the cathode almost finished discharging when the anode finished the reaction of doping and de-doping of anions (the reaction at ④ in FIG. 5).

In Comparative Example 2, the capacity (discharge capacity down to 80% electromotive force) was 29 mAh/g at 1 mA/cm$^2$ with an electromotive force, 0.9 V, of the battery. Table 1 shows a cyclic property, at a charge and discharge current density of 10 mA/cm$^2$, 25° C. and 60% discharge depth. In Comparative Example 2, the cycle number from the initial capacity to 80% thereof was 125, which was very small. It was because the reaction of polyaniline at the low cyclic property region (the reaction at ④ in FIG. 5) was employed.

EXAMPLE 4

A capacitor was produced, using poly(6-nitroindole) as the anode material 2; polyaniline as the cathode material 4; and an aqueous solution of 40% sulfuric acid as the electrolytic solution.

An electrode of the anode material 2 was produced through the same procedures as those of Example 1. An electrode of the cathode material 4 was produced by mixing polyaniline with crystalline carbon as the conductive auxiliary at a weight ratio of 75:25, followed by addition of 40% sulfuric acid (5.3 mol/l) to produce an electrode paste. This paste was coated over a collector 1' with a gasket 5 similar to the anode.

Each electrode was pressed at a pressure of 1370 pKa (14 kgf/cm$^2$) to remove extra sulfuric acid. Thereafter, a separator 3, containing 40% sulfuric acid impregnated therein, was sandwiched between the anode material 2 and the cathode material 4 to produce a capacitor as shown in FIG. 1.

Poly(6-nitroindole), used for the anode material, was in a state that sulfuric acid ions were doped into it in the aqueous solution of 40% sulfuric acid, and the redox reaction accompanied with absorption and desorption of protons, corresponding to the reaction formula (2), proceeded at the region ② (about 900–1200 mV vs. Ag/AgCl) in FIG. 2. As for polyaniline of the cathode material, the redox reaction accompanied with doping and de-doping protons proceeded at the region ③ (about −200 to 500 mV vs. Ag/AgCl) in FIG. 5. Accordingly, for the capacitor, constant current charge and discharge tests were performed at 100 mA/cm² with an electromotive force of 1.3 V.

Figure 7:
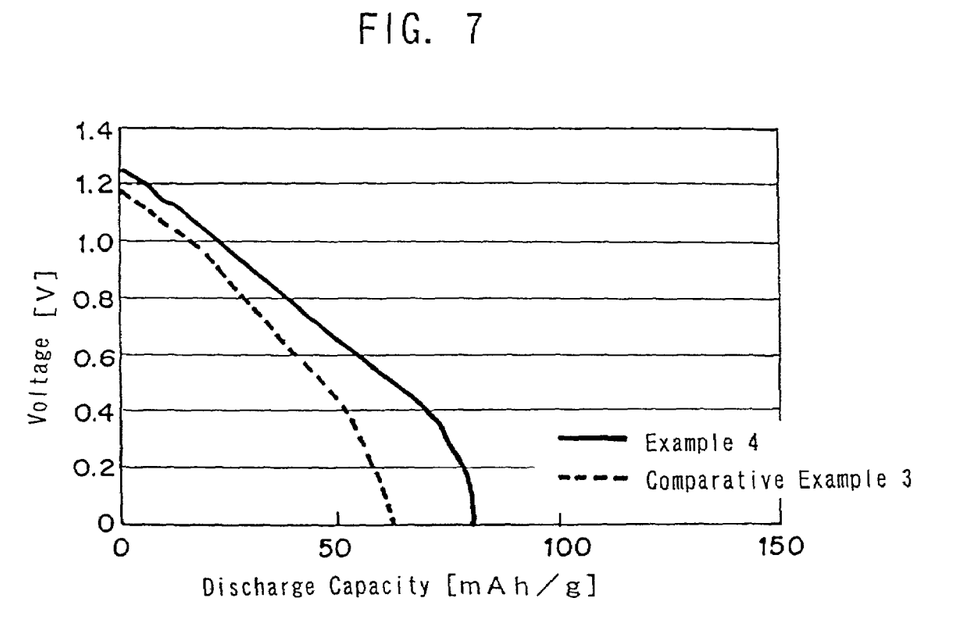
FIG. 7 shows discharge curves of capacitors according to Example 4 and Comparative Example 3.

The results from the capacitor are shown in Table 4, and the discharge curve is shown in FIG. 7. The reactions of the electrode materials used in this example had almost similar reactive potentials, and the discharge curve of the capacitor did not exhibit a flat part at the time of discharging.

The discharge capacity, obtained from the discharge starting voltage to 80% thereof, was 18 mAh/g. The total discharge capacity was 81 mAh/g. Table 4 shows a cyclic property, at a charge and discharge current density of 100 mA/cm², 25° C. and 60% discharge depth. In Example 4, the cycle number from the initial capacity to 80% thereof was 32,000.

The capacitor, although with a high voltage of 1.3 V, had an excellent cyclic property of 32,000 cycles.

COMPARATIVE EXAMPLE 3

A capacitor was produced, using polyaniline as the anode material; polyaniline as the cathode material; and an aqueous solution of 40% sulfuric acid as the electrolytic solution. An electrode from the anode material and an electrode from the cathode material were produced through the same procedures as those of Examples 1 and 4.

In the capacitor, the reaction of polyaniline, used for the anode material, was the redox reaction accompanied with absorption and desorption of anions (region ④ in FIG. 5), and the reaction of polyaniline, used for the cathode material, was the redox reaction accompanied with absorption and desorption of protons (region ② in FIG. 5). Accordingly, for the battery with an electromotive force of 1.3 V, tests were performed in the same manner as that of Example 4.

The results from the capacitor are shown in Table 4, and the discharge curve is shown in FIG. 7. The reactions of the electrode materials used for this comparative example had almost similar reactive potentials, and the discharge curve of the capacitor did not exhibit a flat part at the time of discharging, similar to those of Example 4.

The discharge capacity, obtained from the discharge starting voltage to 80% thereof, was 11 mAh/g. The total discharge capacity was 62 mAh/g. Table 4 shows a cyclic property, at a charge and discharge current density of 100 mA/cm², 25° C. and 60% discharge depth. In Comparative Example 3, the cycle number from the initial capacity to 80% thereof was 85 cycles. The capacitor was very low in cyclic property.

In this comparative example, the reaction of doping and de-doping of anions of polyaniline, which had a slow reactive rate, was used in the anode. Therefore, the capacity was low and the cyclic property was low during rapid charging and discharging.

TABLE 4

|  | Electrolytic solution | Dopant | Ions involved in reaction of anode | Voltage (V) | Capacity (mAh/g) | | Cyclic property (cycles) |
|  |  |  |  |  | Down to 80% of starting voltage 100 mA/cm² | Total capacity 100 mA/cm² |  |
| --- | --- | --- | --- | --- | --- | --- | --- |
| Example 4 | Aqueous solution | $SO_4^{2-}$ | $H^+$ | 1.3 | 18 | 81 | 32,000 |
| Comparative Example 3 | Aqueous solution | $SO_4^{2-}$ | $HSO_4^-$ or $SO_4^{2-}$ | 1.3 | 11 | 62 | 85 |

According to the present invention, an indole polymeric compound as an electrode active substance and protons as charge carriers of the polymeric compound are used to provide a secondary battery and capacitor having a high electromotive force together with a high cycle property and being capable of fast charging and discharging.

Having described the embodiments consistent with the present invention, other embodiments and variations consistent with the present invention will be apparent to those skilled in the art. Therefore, the invention should not be viewed as limited to the disclosed embodiments but rather should be viewed as limited only by the spirit and scope of the appended claims.

What is claimed is:

1. A capacitor comprising an indole polymeric compound as an electrode active material, said indole polymeric compound using a proton as a charge carrier and having a constituent represented by general formula (1):

wherein each R denotes a hydrogen atom, a halogen atom, a hydroxyl group, a carboxyl group, a sulfonic group, a sulfuric acid group, a nitro group, a cyano group, an alkyl group, an aryl group, an alkoxyl group, an amino group, an alkylthio group and an arylthio group, which may be the same or different from each other, and at least one R is a substituent other than a hydrogen atom and a cathode containing polyphenylquinoxaline represented by structural formula (3):

2. The capacitor according to claim 1, having an indole polymeric compound electrode containing 30–95% by weight of said indole polymeric compound.

3. The capacitor according to claim 2, having an aqueous or a nonaqueous solution of an electrolyte containing $10^{-3}$ mol/l to 18 mol/ 1 of protons.

4. The capacitor according claim 2, having an aqueous or a nonaqueous solution of an electrolyte containing 10–1 mol/l to 7 mol/l of protons.

5. The capacitor according to claim 1, having an aqueous or a nonaqueous solution of an electrolyte containing $10^{-3}$ mol/l to 18 mol/l of protons.

6. The capacitor according claim 1, having an aqueous or a nonaqueous solution of an electrolyte containing $10^{-1}$ mol/l to 7 mol/l of protons.

7. A capacitor comprising an anode containing poly(6-nitroindole) represented by structural formula (2):

a separator, an electrolytic solution of 40% sulfuric acid, and a cathode containing polyaniline.

8. A capacitor comprising an indole polymeric compound as an electrode active material, said indole polymeric compound using a proton as a charge carrier and having a constituent represented by general formula (1):

wherein each R denotes a hydrogen atom, a halogen atom, a hydroxyl group, a carboxyl group, a sulfonic group, a sulfuric acid group, a nitro group, a cyano group, an alkyl group, an aryl group, an alkoxyl group, an amino group, an alkylthio group and an arylthio group, which may be the same or different from each other, and at least one R is a substituent other than a hydrogen atom and a cathode containing polyaniline.

9. The capacitor according to claim 8, further comprising an anode containing poly (6-nitroindole) represented by structural formula (2):

a separator, an electrolytic solution of 40% sulfuric acid, and a cathode containing polyaniline.

10. The capacitor according to claim 8, having an indole polymeric compound electrode containing 30–95% by weight of said indole polymeric compound.

11. The capacitor according to claim 10, having an aqueous or a nonaqueous solution of an electrolyte containing 10-3 mol/l to 18 mol/l of protons.

12. The capacitor according to claim 10, having an aqueous or a nonaqueous solution of an electrolyte containing $10^{-1}$ mol/l to mol/l of protons.

13. The capacitor according to claim 8, having an aqueous or a nonaqueous solution of an electrolyte containing $10^{-3}$ to 18 mol/1 of protons.

14. The capacitor according to claim 8, having an aqueous or a nonaqueous solution of an electrolyte containing 10–1 mol/l to 7 mol/l of protons.

* * * * *